Figure 1:
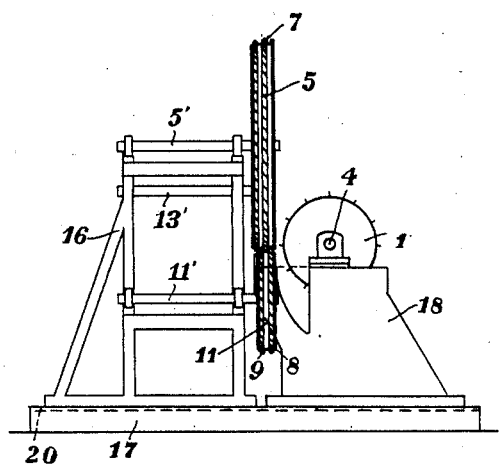

Nov. 25, 1930.  K. ERB  1,782,918

DECORTICATING AND DEPULPING MACHINE

Filed April 6, 1929  3 Sheets-Sheet 1

Inventor:
Karl Erb by Karl Viertel
Attorney

Nov. 25, 1930.  K. ERB  1,782,918

DECORTICATING AND DEPULPING MACHINE

Filed April 6, 1929  3 Sheets-Sheet 2

Inventor:
Karl Erb by Karl Viertel
Attorney

Nov. 25, 1930.                 K. ERB                    1,782,918
                  DECORTICATING AND DEPULPING MACHINE
                      Filed April 6, 1929      3 Sheets-Sheet 3

Inventor:
Karl Erb
by Karl Viertel
Attorney

Patented Nov. 25, 1930

1,782,918

UNITED STATES PATENT OFFICE

KARL ERB, OF FRANKFORT-ON-THE-MAIN-GRIESHEIM, GERMANY

DECORTICATING AND DEPULPING MACHINE

Application filed April 6, 1929, Serial No. 353,133, and in Germany September 17, 1927.

The invention hereinafter described relates to improvements in machines for decorticating the leaves of fibrous plants and more especially of the class of the socalled Endo-genæ, comprising Dracænas, Yuccacænas and like liliaceous plants the leaves of which are known to have skins of a particularly tough and leathery nature offering great difficulties to their decortication and proper manipulation during the decorticating process.

In the art of decorticating leaves of other fibrous plants such as sisal hemp which are of a less stubborn nature, being more pliable and having softer skins than those referred to above, machines are known in which a relatively long section of each leaf is at one stroke subjected to the decorticating action of rotary scraping drums, the leaves being supported at their back by concave blocks or breast plates surrounding a comparatively large circumferential area of the said drums, and being conveyed past said drums in the longitudinal direction of the latter i. e. in a substantially horizontal path.
As a matter of fact known amongst experts in this field the fibres of leaves having harder and tougher skins such as those of Dracænas, Yuccacænas, etc. mentioned hereinbefore, are liable to be excessively strained, and to be broken into relatively short pieces of little commercial value, if they are decorticated by machines of the type set forth above.

In my co-pending applications Serial Numbers 363,834 and 363,835 inventions are dealt with relating to decorticating machines of an improved design by which it is attempted to overcome the above explained drawbacks, said machine having leaf supporting members of relatively small width when compared with the circumference of the scraping drums, the leaves being conveyed past said drums and supporting members in an upwardly inclined path.

The invention hereinafter described aims at further improving decorticating machines of said type by providing simple and inexpensive means for the proper manipulation of the leaves on their travel through the machine.
Another object of the invention is to so design the leaf conveying mechanism that the scraping drums can be co-axially arranged on the same level, thus simplifying their driving attachment and facilitating their control and supervision.

Another object intimately connected with the former is to make both scraping drums and the conveying mechanism readily accessible as a whole unit in cases of repair.

Still further objects aimed at by this invention will incidentally appear hereinafter.

The nature and the scope of my invention are outlined in the appended claims and will be more fully understood by the following specification:

Figure 2:
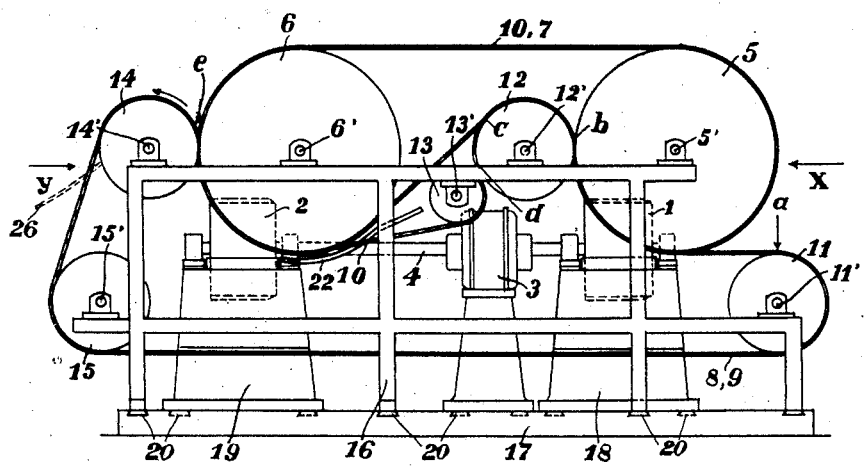

Fig. 1 is a diagrammatic front elevation of an improved decorticating and depulping machine according to the invention, seen in the direction of arrow $x$ in Fig. 2, Fig. 2 is a side elevation of the machine,

Figs. 3–7, done in a larger scale, show a leaf under treatment on its travel through the machine, viz.

Figure 3:
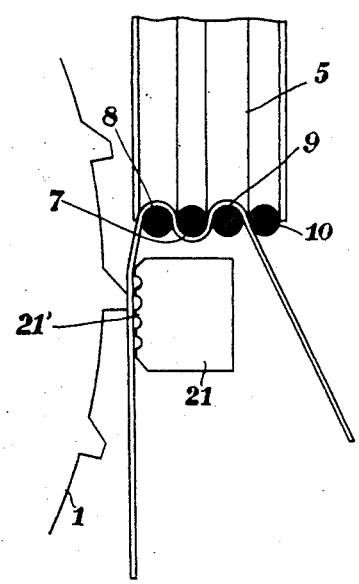

Fig. 3 showing the said leaf passing the first scraping drum,

Figure 5:
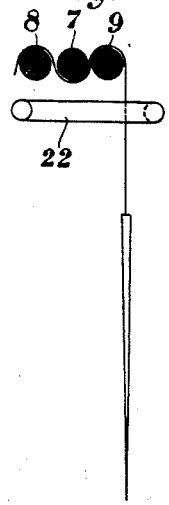
Figure 3A:
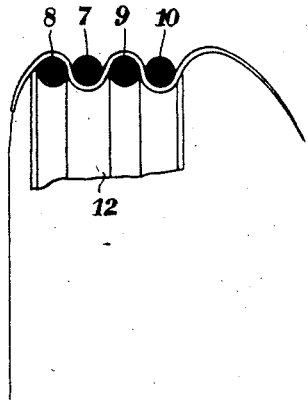
Figure 6:
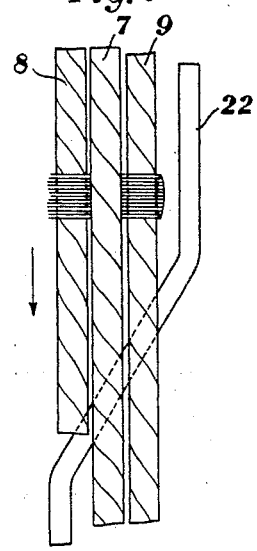
Figure 7:
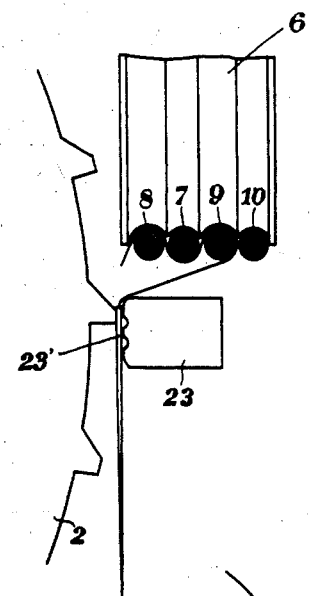
Figure 8:
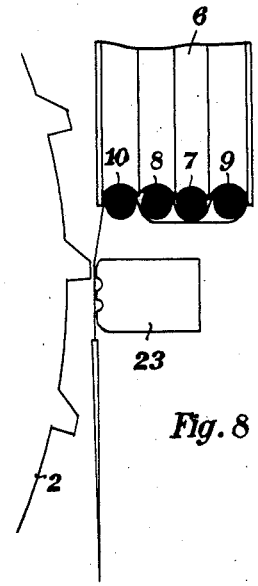
Figure 4:
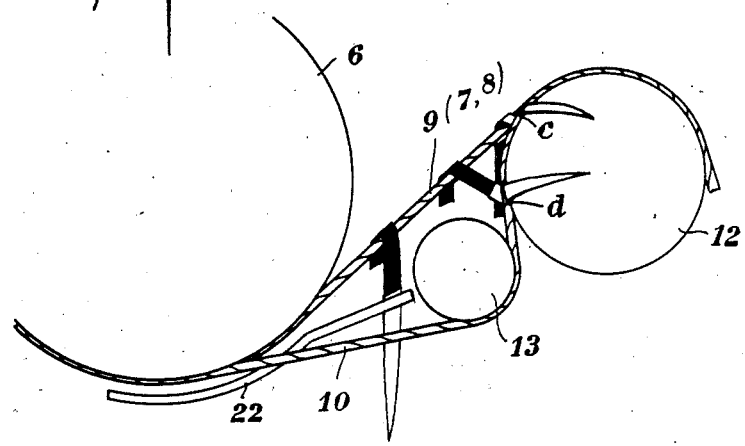
Figure 9:
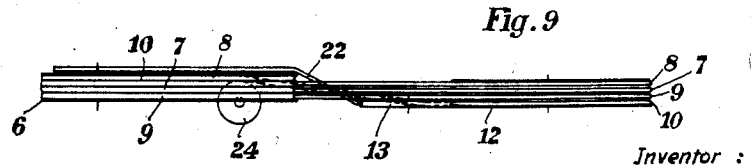

Fig. 3ª showing the leaf having been transferred to an intermediate pulley,

Fig. 4 illustrating the different stages of the intermediate pulling operation for transferring the leaf into the position shown in Fig. 5, Fig. 5 illustrating the new position of the leaf after the pulling operation, Fig. 6 is a plan view related to Fig. 5, Fig. 7 shows the leaf under treatment passing the second scraping drum, Figs. 8 and 9 are a cross section and a plan view respectively showing a modified arrangement of the conveying ropes for holding the leaves on their travel past the second scraping drum.

The decorticating and depulping machine, diagrammatically shown in the drawings by way of an example, consists of a pair of scraping drums 1, 2 known per se, being coaxially arranged to each other and having a common driving shaft 4 which is mounted on stands 18, 19 and is driven e. g. by an electric motor 3, or a belt drive, chain or the like from any suitable source of power.

Oppositely to the working faces of each of said scraping drums abutments 21, 23 (Figs. 3, 7, 8) are arranged by which the leaves are supported during the decorticating and depulping process.

I prefer to provide projections 21′, 23′, teeth, ridges or the like at the front faces of said abutments by which the depulping process is effectively enhanced.

The stands 18, 19 referred to above, are slidably arranged in guide ways 20 of the machine frame 17 and can be fixed by suitable clamping means such as screws, wedges or the like (not shown) in any desired position relatively to the leaf conveying mechanism.

The said conveying mechanism is composed in an upper set of gripper and guide pulleys 5, 12, 13, 6 and a lower set of guide pulleys 11, 14, 15.

Four circumferential grooves for the reception of the upper (7, 10) and lower conveying ropes (8, 9) respectively are formed at each pulley of the upper system 5, 12, 6, while the pulley 13 has one circumferential groove only for reasons indicated hereinafter.

Two circumferential grooves for the reception of the lower conveying ropes 8, 9 are formed at the lower system of guide pulleys 11, 14, 15.

All of the said pulleys are mounted in flying position on rotary shafts 5′, 6′, 11′, 12′, 13′, 14′, 15′ which are supported in bearings of an upright frame 16, the latter being slidably mounted in guide ways 20 of the machine frame 17, so as to be capable of being adjusted and fixed in any desired position relatively to the scraping drums 1, 2 and to be withdrawn from the latter whenever necessary for supervision and repair of the conveying mechanism.

The leaves to be decorticated and depulped, are fed into the machine by placing them at "a" (Fig. 2) crosswisely on the conveying ropes 8, 9 viz. in a position parallel to the axis 11′ of the pulley 11; on passing into the machine in the direction of arrow x the leaves, being supported substantially in the middle of their whole length are then gripped by the lower ropes 8, 9 by which they are pressed into the corresponding grooves of the upper pulley 5 (Fig. 3), thus being firmly clamped and fixed in their specific position during the first stage of the decorticating and depulping process.

As can be seen in Fig. 2 the leaves are carried forward through the space between the scraping drum 1 and its abutment 21 in an ascending path, and their faces opposed to the scraping drums are thus gradually decorticated and depulped.

At "b" in Fig. 2 the upper and lower ropes pass on to the intermediate pulley 12, the upper ropes now acting as clamping devices by pressing the leaves into corresponding grooves of said pulley 12, shown in Fig. 3ª.

Only three of the ropes—viz. 7, 8, 9— thence proceed directly to the gripping and guiding pulley 6, as indicated in Figs. 2, 4 and 5, while rope 10 of the upper set deviates from its mates forming a loop by running around the pulley 13 and thence to pulley 6.

In passing around pulley 12 from c to d (Fig. 4) the rope 10 will keep the leaf clamped to said pulley, the other part of said leaf which until then was carried by the ropes 8 and 9, thereby being withdrawn and protracted in its longitudinal direction as shown in Fig. 4.

Subsequently the leaf is freed at d from its engagement by the rope 10 and its protracted portion will drop into the vertical position as shown in Fig. 5, while its decorticated and depulped portion is held between the ropes 8, 7, 9 as indicated in Figs. 5 and 6.

A bent arm 22 or like guide member, seen in Figs. 2, 5, and 6, is fixed underneath the ropes 8, 7, 9 acting as a directrix for deflecting the depending portion of the leaf into the space between the second scraping drum 2 and its abutment 23, as shown in Fig. 7.

The leaves on being carried forward by the ropes 8, 7, 9 will pass along the scraping drum 2 in an ascending path, and will be gradually decorticated and depulped by the latter in exactly the same manner as described with regard to drum 1.

At "e" in Fig. 2 the lower ropes 8, 9 become disengaged from pulley 6 carrying with them the fibres of the leaves and discharging same from the machine, at y where they are taken off by fingers 26.

It should be understood that various changes and modifications may be made in the construction and design of decorticating and depulping machines described above and in the assemblage and cooperation of their component parts, without substantially departing from the spirit and the salient ideas of our invention and without sacrificing any of the advantages referred to hereinbefore:

A modified function of the conveying mechanism may be preferable in special cases as illustrated in Figs. 2, 8, 9, the latter showing how rope 10 too may be used for holding the leaves clamped in the circumferential grooves of pulley 6 at the second scraping drum.

In this instance rope 10 after departing from pulley 13 is temporarily deflected from its path by a guide pulley 24, so as to run into the rearmost groove of pulley 6 (Fig. 8) and, on having passed point e, rope 10 is returned into its normal path by another auxiliary guide pulley 25.

A special advantage obtained by re-arranging the path of rope 10 in the manner shown in Figs. 8, 9, and in Fig. 2 lies in the fact that said rope on being deflected by pulley 24 will automatically guide backwards the depending leaf portion to the scraping drum 2, so that an auxiliary guide member such as 22 can be dispensed with.

Intermediate spaces of ample size should be provided between the circumferential grooves of pulley 12 in order to lessen the frictional contact of the leaves and the ropes at the section where the leaves are protracted transversely to the conveying ropes 7, 8, 9 in the manner described above.

Machines of the type described may be used to advantage also for decorticating and depulping leaves of agaves and other fleshy-leaved tropical plants of kindred genus, containing valuable fibres suitable for manufacturing and other purposes.

What I claim is:—

1. In a leaf decorticating machine of the type having two scraping drums arranged one beyond the other in the direction in which the leaves are carried past said drums by a conveyer, comprising an upper set and a lower set of endless ropes, the combination with said scraping drums and conveying ropes of means for protracting the leaves under treatment in their longitudinal direction transversely to the conveying ropes after having been decorticated by the first scraping drum, and of guiding means cooperatively associated with the endless conveying ropes so as to deflect the depending ends of the protracted leaves into working contact with the second scraping drum.

2. A leaf decorticating machine, having the features set forth in claim 1, in which the endless flexible conveying ropes are carried on pulleys which are mounted in flying position.

3. A leaf decorticating machine, having the features set forth in claim 1, in which the endless flexible conveying ropes are carried on pulleys which are mounted in flying position on a common frame, means being provided for withdrawing the said frame from the scraping drums so as to render both the scraping drums and the conveyer readily accessible.

4. A leaf decorticating machine, having the features set forth in claim 1, in which the endless flexible conveying ropes are carried on pulleys which are mounted in flying position on a common frame means being provided for removing the scraping drums from said frame so as to render both the conveyer and the scraping drums readily accessible.

5. A leaf decorticating machine, having the features set forth in claim 1, in which a rotary element is provided, adapted to change the course of travel of one of the ropes of the upper set, so as to cause the undecorticated ends of the leaves to be retained temporarily in clamped condition and in turn the leaves to be protracted transversely to the rest of the ropes.

6. A leaf decorticating machine, having the features set forth in claim 1, in which a rotary element is provided, adapted to change the course of travel of one of the ropes of the upper set, so as to cause the undecorticated ends of the leaves to be retained temporarily in clamped condition and in turn the leaves to be protracted transversely to the rest of the ropes, said rotary element comprising an auxiliary pulley so arranged as to deflect the said rope of the upper set and segregate the latter from the rest of the ropes.

7. A leaf decorticating machine, having the features set forth in claim 1, in which one rope of the upper set serves as a guiding member, means being provided for changing the course of travel of said rope so as to deflect the depending undecorticated ends of the protracted leaves into working contact with the second scraping drum.

8. A leaf decorticating machine, having the features set forth in claim 1, in which one rope of the upper set serves as a guiding member, means being provided for changing the course of travel of said rope so as to deflect the depending undecorticated ends of the protracted leaves into working contact with the second scraping drum, said means comprising an auxiliary pulley (24) adapted to assist in holding the leaves firmly clamped when being dragged past the second scraping drum.

9. A leaf decorticating machine, having the features set forth in claim 1, in which the two scraping drums are coaxially arranged to each other.

In testimony whereof I have signed my name to this specification.

KARL ERB.